Patented Aug. 11, 1942

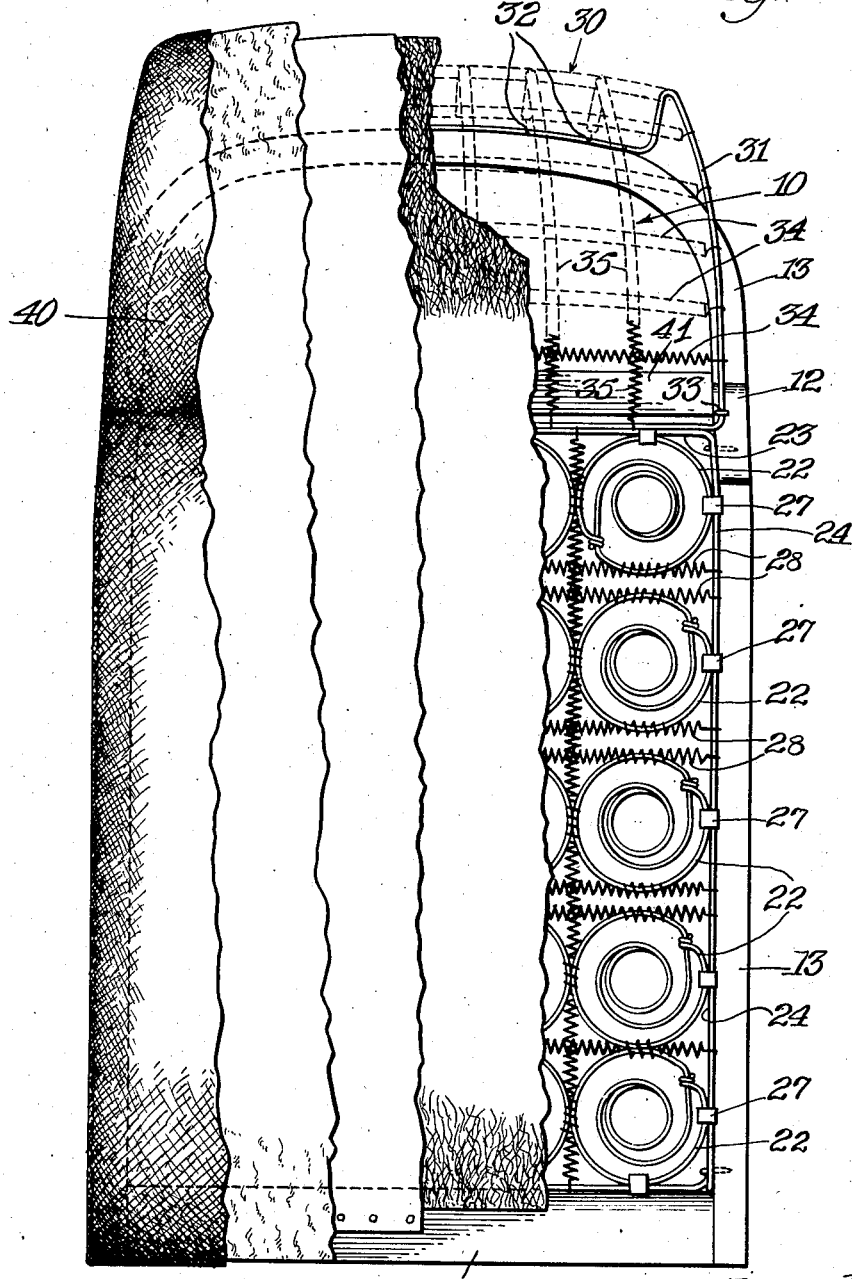

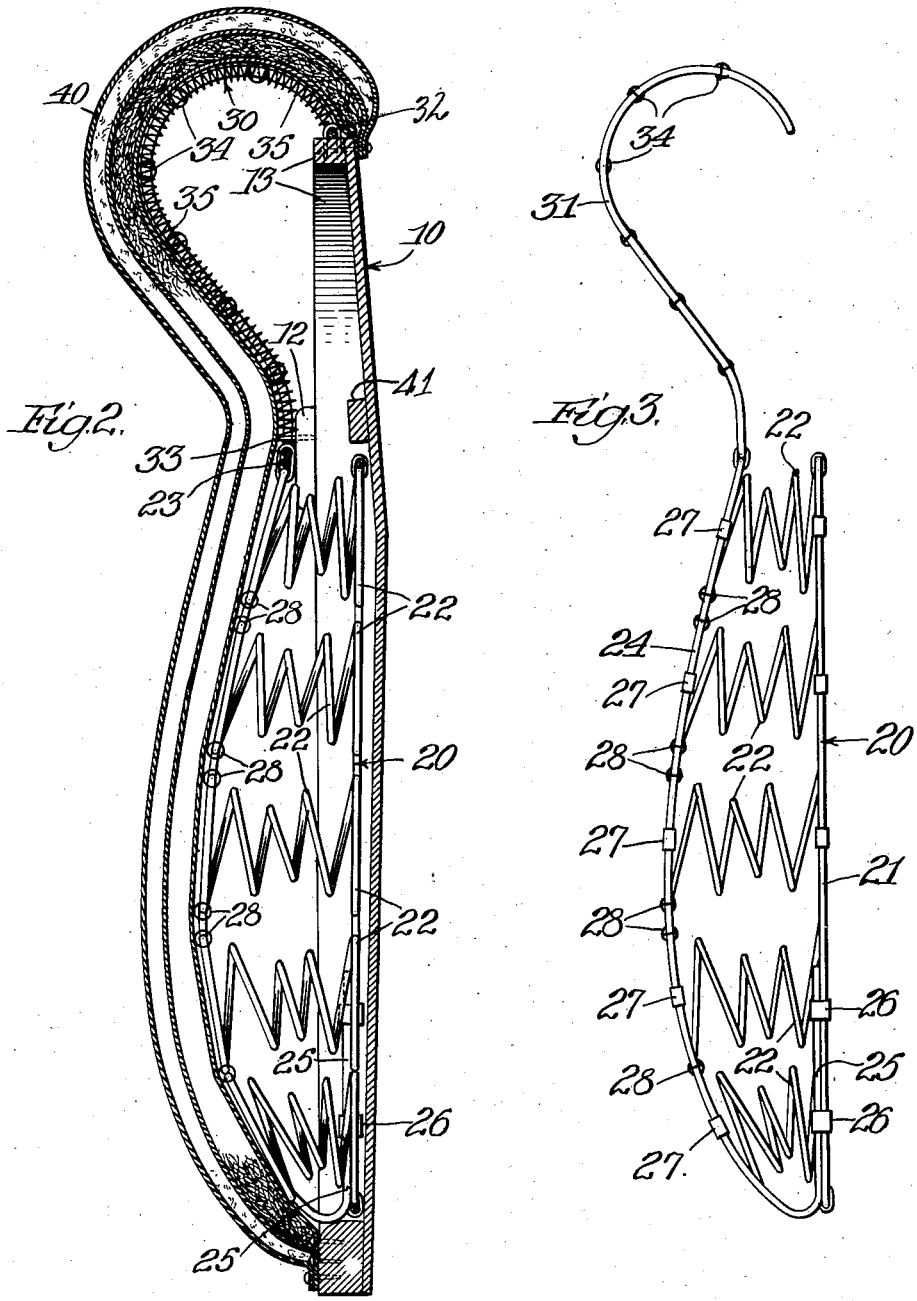

2,292,597

UNITED STATES PATENT OFFICE 2,292,597

CUSHION STRUCTURE FOR SEAT BACKS

Walter F. Bartlett, Tinley Park, and Matthieu Grzenia, Chicago, Ill., assignors to S. Karpen & Bros., Chicago, Ill., a corporation of Illinois Application January 2, 1940, Serial No. 312,104

3 Claims. (Cl. 155—181)

This invention relates to a cushion structure and more particularly to a cushion structure for seat backs such as are used in coaches, busses and the like.

An important object of the invention is to provide a structure which will give adequate support but which will also be flexible and sufficiently pliable to yield a maximum of comfort. It is particularly desired to provide a structure including a head rest which is soft and flexible and easily yieldable, but yet will hold its shape well.

Another object is to provide a cushion structure for such use which can be manufactured at a minimum cost and without the necessity for using large amounts of padding, especially in the head roll.

A further object is to provide a unitary structure which has the necessary stiffness for the body portion of the seat back but which also is sufficiently pliable and flexible at its upper portion to serve as a comfortable head rest. Other objects and advantages will appear as the specification proceeds.

The invention is illustrated, in a preferred embodiment, by the accompanying drawings, in which—

Figure 1 is a plan view of a seat back showing the front covering and padding material broken away to expose the spring structure; Fig. 2, a vertical sectional view of the complete seat back; and Fig. 3, a side view of the spring structure.

As illustrated, the improved structure includes a seat frame 10 which is rigid and may be formed of wood or other rigid material. Frame 10 extends about the roll edges of the seat back, and as here shown, has rounded corners at the top. About the outer edges of frame 10 are forwardly extending edge pieces 13, and at the bottom is the transverse cross piece 11. Toward the upper portion of the frame is a cross piece 41 secured to the edges 13 at opposite sides of the frame. On the edge pieces 13 on opposite sides of the frame 10 are mounted the forwardly extending projections 12 (only one of said projections being shown), the projections 12 being arranged to support one of the spring structures, as will later be described.

A body spring structure 20 is carried within frame 10 and this includes a rectangular rear wire frame 21 to which are attached the coils 22. On the front side of the body spring 20 is a frame wire 23, the upper central portion of which is arranged in the horizontal plane. The side members 24 of the wire 23 extend downwardly in convex curved outline, as shown more clearly in Fig. 2. Following the members 24 downwardly along the sides of the spring, it is seen that they curve forwardly along the upper portion of the spring body, and along the lower portion they turn and curve rearwardly. At the bottom of this spring body they have their end portions 25 turned upwardly and secured to the rear frame 21 by means of the clamps 26, and in this way form bottom loops which are resilient in character.

The coils 22 are attached at their top to frame wire 23 by clamp fasteners 27 and also are secured together and to frame wire 23 by means of helicals 28 in the usual manner. However, it will be noted that at the bottom end of body spring 20 the helicals 28 are attached to the rear frame 21, since the front frame wire 23 does not extend across the bottom.

The pillow spring structure 30 includes a wire frame 31 extending about the outside of this structure. The bottom or horizontal side of frame 31 is supported adjacent the middle portion of the wire frame part 23, and is secured to the forward projections 12 by means of staples 33. The sides of wire frame 31 are bowed forwardly in curved outline, as seen more clearly in Fig. 3. The upper horizontal portion of wire frame 31 lies on the top of the rigid frame 10 and is secured thereto as by the staples 32.

Extending transversely between opposite sides of the frame 31 are spaced helical springs 34, and extending between the top and bottom horizontal members of this frame are the spaced helical springs 35. The horizontal springs 34 intersect and interlock with the longitudinal springs 35 so as to form a spring network which is yieldable in all directions, yet supported against displacement of any part of the spring structure. It will be observed that the network thus formed is held in the shape of a roll, as is better illustrated in Fig. 2 of the drawings.

Covering and padding material of any suitable type may be placed over the front of the spring structures. As is shown in the illustrations here given, a layer of sisal or other suitable filling material enclosed between sheeting may form the first layer adjacent the spring structures, and over this may be placed a layer of cotton or other suitable filling material covered by fabric 40. At the bottom of the structure, the covering material may be tacked to the bottom cross strip 11, and at the top of the structure may be secured in a similar manner. It will be observed that the covering and padding material may be continuous from the top to the bottom without need for interruption because of the presence of both the body section and the pillow section of the cushion structure. This construction is much to be preferred over prior methods in which it has been necessary to provide separate pillow and body sections.

While we have shown a sisal layer and a cotton layer, it will be understood that any other suitable filling material, of well known types, may be substituted for these.

By having the front frame members of the body spring 20 in curved outline, and by having the bottom wire portions turned against themselves to form a loop, we not only provide a more suitable cushion outline, but also obtain a benefit in the spring action, since here the frame members themselves are resilient and act as springs.

The pillow spring structure 30 is particularly advantageous, in that it is very soft and pliable and yields easily when the person lays his head back against the pillow. This advantage is gained largely because the spring network formed by helical springs 34 and 35 can yield at any place without the necessity of distorting the spring at other places. Since the helical springs are interlocked at their points of intersection, there is no danger of any spring parts being displaced or lumped together, and the resiliency of the helicals themselves keeps the whole network in its proper shape in the form of a roll.

The network of helical springs also gives the advantage that it can be entirely hollow and need not be filled with padding material, such as cotton, as prior pillow structures have required. This serves to cut down on the weight and the expense of manufacture. The structure herein provided is also advantageous, in that it permits the main portion of the seat back to be included as a unit with the pillow portion. Here we have the relatively stiff coil body spring encased together with the relatively pliable pillow spring inside a single unit of covering material.

Although we have described in detail but a single embodiment of the invention, it is apparent that many modifications and variations may be employed without departing from the spirit of our invention. The foregoing detailed description has been given for clearness of understanding only and no unnecessary limitations should be understood therefrom.

We claim:

1. A seat back comprising a rigid rear seat frame, including a supporting member mounted on said frame, a body spring of the coil type, having a frame part about the same and extending downwardly along the body spring in convex curvature, a spring roll including a resilient wire frame and a network of helical springs extending within said wire frame, the lower portion of said wire frame being secured to said member and to the frame of the body spring, the upper horizontal portion of said wire frame being secured to the top of said rear seat frame, and covering material extending over the front of said body spring and spring roll and secured at its top and bottom with said rear seat frame.

2. A seat back cushion structure comprising a rigid rear seat frame, a supporting member mounted on said frame, a body spring of the coil type equipped with a resilient wire frame extending about the same, the wire frame extending downwardly along the body spring in convex curvature, a spring roll including a resilient wire frame and an interlocking network of helical springs extending within the same, the lower portion of the spring roll frame being secured to said member and to the upper portion of the frame of the body spring, the sides of the spring roll frame being turned backwardly and downwardly at the upper portion thereof and having their end portions secured to the rigid seat frame whereby the front part of the spring roll frame is resilient to pressure from the front and is able to function as a spring, and covering material extending over the front of said body spring and spring roll and secured at its top and bottom to said rear seat frame.

3. A seat back cushion structure comprising a rigid rear seat frame, a body spring of the coil type supported by the lower portion of the rigid frame, a resilient wire frame extending about the body spring and mounted on the rigid frame, a spring roll at the upper portion of the rigid seat frame including a resilient wire frame and an interlocking network of helical springs extending within the wire frame, said frame being secured to the rigid seat back, the resilient wire frames being also secured to each other, and covering material extending as a single unit over both the body spring and the spring roll, the upper portion of the cushion structure constituting the head rest of the structure.

WALTER F. BARTLETT.
MATTHIEU GRZENIA.